US009350647B2

(12) United States Patent
Pranab Kumar

(10) Patent No.: US 9,350,647 B2
(45) Date of Patent: May 24, 2016

(54) RING TOPOLOGY STORAGE SYSTEM, STORAGE DEVICE IN RING TOPOLOGY STORAGE NETWORK AND METHOD FOR HANDLING MULTICAST COMMAND PACKETS IN RING TOPOLOGY

(71) Applicant: SAMSUNG ELECTRONICS CO., LTD., Suwon-si, Gyeonggi-do (KR)

(72) Inventor: Teegavarapu Pranab Kumar, Bangalore (IN)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 149 days.

(21) Appl. No.: 14/198,977

(22) Filed: Mar. 6, 2014

(65) Prior Publication Data

US 2014/0269706 A1    Sep. 18, 2014

(30) Foreign Application Priority Data

Mar. 15, 2013    (KR) .................. 10-2013-0028100

(51) Int. Cl.
*H04L 12/761* (2013.01)
*H04L 12/751* (2013.01)
*H04L 12/42* (2006.01)

(52) U.S. Cl.
CPC ............... *H04L 45/16* (2013.01); *H04L 12/42* (2013.01); *H04L 45/02* (2013.01)

(58) Field of Classification Search
None
See application file for complete search history.

(56) References Cited

U.S. PATENT DOCUMENTS

| 8,077,610 | B1 | 12/2011 | Arad et al. | |
|---|---|---|---|---|
| 2004/0148482 | A1* | 7/2004 | Grundy | G06F 12/06 711/167 |
| 2008/0201548 | A1* | 8/2008 | Przybylski | G06F 13/4243 711/171 |
| 2011/0072185 | A1 | 3/2011 | Pinto et al. | |
| 2012/0177050 | A1 | 7/2012 | Fujimoto | |
| 2012/0254600 | A1* | 10/2012 | Fujimoto | G06F 9/4405 713/1 |

FOREIGN PATENT DOCUMENTS

KR    1020080050224    6/2008

* cited by examiner

*Primary Examiner* — Diane Lo
(74) *Attorney, Agent, or Firm* — F. Chau & Associates, LLC

(57) ABSTRACT

A method of handling multicast command packets in a ring topology includes transmitting a multicast indication packet indicating that at least one command packet following the multicast indication packet is intended for at least two of a plurality of storage devices connected in the ring topology, determining whether the at least one command packet following the multicast indication packet is intended for each storage device from among the plurality of storage devices based on the multicast indication packet, and operating at least one storage device from among the plurality of storage devices that the at least one command packet is not intended for in a packet bypass mode until the at least one command packet has been processed by the at least two storage devices that the at least one command packet is intended for.

20 Claims, 6 Drawing Sheets

RING TOPOLOGY STORAGE SYSTEM, STORAGE DEVICE IN RING TOPOLOGY STORAGE NETWORK AND METHOD FOR HANDLING MULTICAST COMMAND PACKETS IN RING TOPOLOGY

CROSS-REFERENCE TO RELATED APPLICATIONS

This application claims priority under 35 U.S.C. §119 to Korean Patent Application No. 10-2013-0028100, filed on Mar. 15, 2013, the disclosure of which is incorporated by reference herein in its entirety.

TECHNICAL FIELD

Exemplary embodiments of the present invention relate to storage systems, and more particularly, to handling multicast command packets in a ring topology storage network.

DISCUSSION OF THE RELATED ART

A ring topology storage system may include a host device and a plurality of storage devices in communication with the host device. Ring topology refers to a type of network configuration in which multiple storage devices are connected in series with the first storage device, and the last storage device of the plurality of storage devices is connected directly to the host device. For example, the transmitter (Tx) circuit of the host device may be connected to the receiver (Rx) circuit of the first device, the transmitter (Tx) circuit of the first storage device may be connected to the receiver (Rx) circuit of the second storage device, etc. This configuration may be repeated through an Nth storage device. The transmitter (Tx) circuit of the Nth storage device N may be connected to the receiver (Rx) circuit of the host device, thereby completing the ring connection.

SUMMARY

Exemplary embodiments of the present invention provide a method and system for handling multicast command packets in a ring topology storage network.

In an exemplary embodiment, a method includes determining whether one or more command packets following a multicast indication packet are intended for itself based on device identifiers in the multicast indication packet. The multicast indication packet indicates that the one or more command packets following the multicast indication packet are intended for at least two of a plurality of storage devices connected in a ring topology. The method may also include operating in a packet bypass mode until the one or more command packets are processed by the at least two storage devices in the ring topology if the one or more command packets following the multicast indication packet are not intended for itself.

The method may also include continuing to operate in a normal mode if the one or more command packets following the multicast indication packet are intended for itself. Furthermore, the method may include processing the one or more command packets following the multicast indication packet if the one or more command packets are intended for itself, sending a response packet to a host device connected to the ring topology, and sending the one or more command packets following the respective response packet to the next (e.g., directly connected) storage device in the ring topology.

The method may further include passing the multicast indication packet to a next (e.g., directly connected) storage device in the ring topology. Additionally, the method may include entering a normal mode of operation from the packet bypass mode upon receiving a multicast termination packet. The multicast termination packet indicates that processing of the one or more command packets by the at least two storage devices is complete.

In an exemplary embodiment, a storage device includes a communication interface and a controller coupled to the communication interface. The communication interface is configured to receive a multicast indication packet from another device. The multicast indication packet indicates that the one or more command packets following the multicast indication packet are intended for at least two of a plurality of storage devices connected in the ring topology storage network. The controller includes a multicast packet processing module configured to determine whether one or more command packets following the multicast indication packet are intended for itself, and to operate in a packet bypass mode until the one or more command packets are processed by the at least two storage devices in the ring topology storage network if the one or more command packets following the multicast indication packet are not intended for itself.

In an exemplary embodiment, a ring topology storage system includes a host device, and a plurality of storage devices in communication with the host device. The host device is configured to send a multicast indication packet to a first storage device in the ring topology. The multicast indication packet indicates that the one or more command packets following the multicast indication packet are intended for at least two of the plurality of storage devices connected in the ring topology storage network. Each of the plurality of storage devices is configured to determine whether one or more command packets following the multicast indication packet are intended for itself. Furthermore, each of the plurality of storage devices are configured to operate in a packet bypass mode until the one or more command packets are processed by the at least two storage devices in the ring topology storage network if the one or more command packets following the multicast indication packet are not intended for itself, and to continue to operate in a normal mode if the one or more command packets following the multicast indication packet are intended for itself.

In an exemplary embodiment, a method of handling multicast command packets in a ring topology includes transmitting a multicast indication packet, wherein the multicast indication packet indicates that at least one command packet following the multicast indication packet is intended for at least two of a plurality of storage devices connected in the ring topology, determining whether the at least one command packet following the multicast indication packet is intended for each storage device from among the plurality of storage devices based on the multicast indication packet, and operating at least one storage device from among the plurality of storage devices that the at least one command packet is not intended for in a packet bypass mode until the at least one command packet has been processed by the at least two storage devices that the at least one command packet is intended for.

In an exemplary embodiment, a storage device in a ring topology storage network includes a communication interface configured to receive a multicast indication packet from another storage device, wherein the multicast indication packet indicates that at least one command packet following the multicast indication packet is intended for at least two of a plurality of storage devices connected in the ring topology storage network, and a controller coupled to the communication interface, wherein the controller includes a multicast packet processing module configured to determine whether the at least one command packet following the multicast indication packet is intended for the storage device, and operate in a packet bypass mode until the at least one command packet is processed by the at least two storage devices that the at least one command packet is intended for when the at least one command packet is not intended for the storage device.

In an exemplary embodiment, a ring topology storage system includes a host device and a plurality of storage devices in communication with the host device. The host device is configured to send a multicast indication packet to a first storage device from among the plurality of storage devices, the multicast indication packet indicating that at least one command packet following the multicast indication packet is intended for at least two of the plurality of storage devices. Each of the plurality of storage devices is configured to determine whether the at least one command packet following the multicast indication packet is intended for itself. Each of the plurality of storage devices is configured to operate in a packet bypass mode until the at least one command packet is processed by the at least two storage devices that the at least one command packet is intended for when the at least one command packet following the multicast indication packet is not intended for itself. Each of the plurality of storage devices is configured to continuously operate in a normal mode when the at least one command packet following the multicast indication packet is intended for itself.

In an exemplary embodiment, a ring topology system includes a plurality of storage devices connected in a ring topology within the ring topology system, and a host device configured to transmit a multicast indication packet. The multicast indication packet indicates that at least one command packet following the multicast indication packet is intended for at least two of the plurality of storage devices. Each of the plurality of storage devices is configured to determine whether the at least one command packet is intended for itself based on the multicast indication packet. At least one storage device from among the plurality of storage devices is configured to operate in a packet bypass mode upon determining that the at least one command packet is not intended for itself, and is configured to continue operating in the packet bypass mode until the at least one command packet has been processed by the at least two storage devices that the at least one command packet is intended for.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
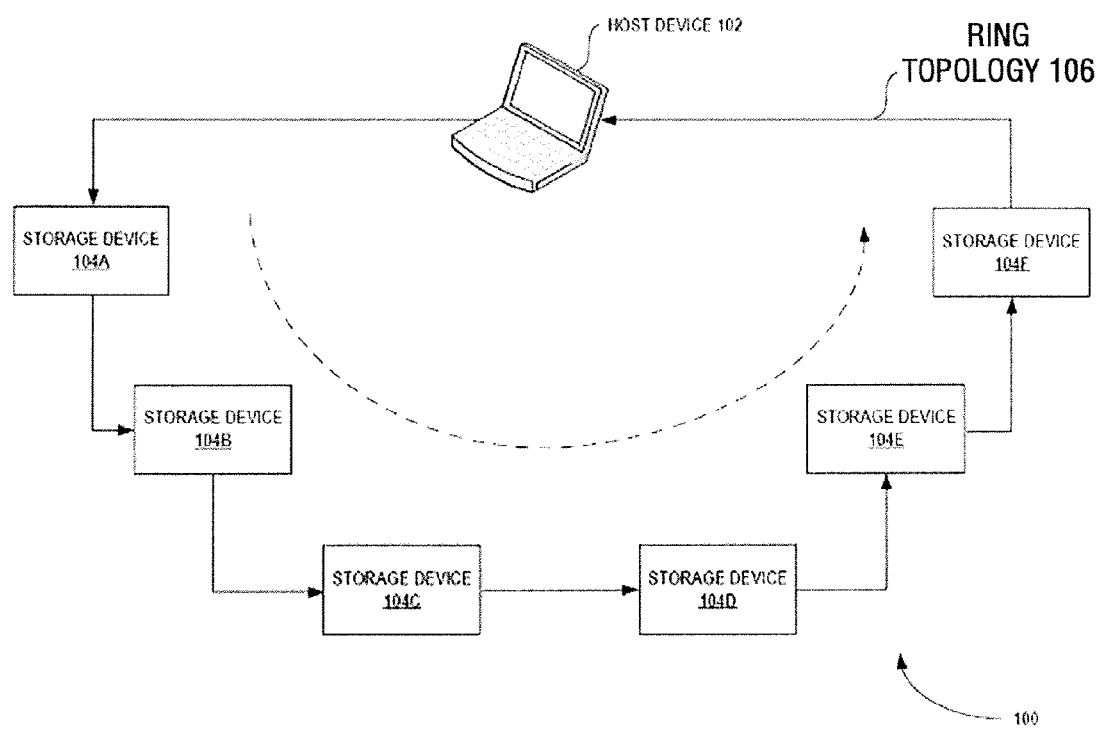
FIG. 1 is a block diagram of a ring topology storage system, according to an exemplary embodiment of the present invention.

Exemplary embodiments of the present invention provide a method and system for handling multicast command packets in a ring topology storage network. Exemplary embodiments of the present invention will be described more fully hereinafter with reference to the accompanying drawings. Like reference numerals may refer to like elements throughout the accompanying drawings.

Herein, the terms ring topology, ring topology storage network, and ring topology storage system may be used interchangeably.

FIG. 1 is a block diagram of a ring topology storage system 100, according to an exemplary embodiment of the present invention. The ring topology storage system 100 includes a host device 102 and storage devices 104A-104F connected in a ring topology 106. The host device 102 may include an electronic device such as, for example, a computer, a mobile phone, a personal digital assistant (PDA), a gaming device, a communication device, a multimedia player device, any other device adapted to communicate with one or more memory devices, or any combination thereof.

The storage devices 104A-104F may be any type of devices capable of storing data. For example, the storage devices 104A-104F may each be a flash memory card, such as an enhanced SDTM device, a microSDTM card, an Embedded SD (eSD) or SD input/output device (SDIO), an Ultra High Speed (UHS)-II storage device, or any other type of device that includes a UHS-II interface (e.g., input/output communication applications).

As shown in FIG. 1, a ring topology network is a type of network in which the storage devices 104A-104F are connected in series with the first storage device 104A, and the last storage device 104F is connected directly to the host device 102. For example, a transmitter (Tx) circuit of the host device 102 may be connected to a receiver (Rx) circuit of the first device 104A, a transmitter (Tx) circuit of the first storage device 104A may be connected to the receiver (Rx) circuit of the second storage device 104B, and this connection scheme may be repeated through an Nth storage device (e.g., storage device 104F in FIG. 1). The transmitter (Tx) circuit of the Nth storage device (e.g., storage device 104F in FIG. 1) may be connected to the receiver (Rx) circuit of the host device 102, thereby completing the ring connection. Thus, in a ring topology network, a closed loop is formed by the included devices.

In the ring topology storage system 100, packets travel in a single direction along a communication path around the ring topology 106. For example, the storage device 104A has a first position on the communication path, the storage device 104B has a second position on the communication path, etc. The sequential order of the positions of devices corresponds to the sequential order that packets travel from device to device along the communication path.

Although the ring topology storage system 100 in FIG. 1 includes six storage devices 104A-104F coupled to the host device 102 via the network, the ring topology storage system 100 is not limited thereto. For example, the ring topology storage system 100 may include any number of storage devices coupled to the host device 102 via the network. Further, it is to be understood that various other structures and devices may be included when forming a storage network having a ring topology that transmits data in a single direction, as shown in FIG. 1.

According to exemplary embodiments of the present invention, when a command packet of the host device 102 is to be processed by more than one, but not all storage devices in the ring topology 106, the host device 102 sends a multicast indication packet. The multicast indication packet indicates that at least one command packet following the multicast indication packet is intended for two or more, but not all storage devices 104A-104F in the ring topology 106. The command packets may include, for example, control command packets or data command packets.

The multicast indication packet indicates which storage devices 104A-104F the packet(s) are intended for. In response to the multicast indication packet, each of the storage devices 104A-104F in the ring topology 106 enters into a packet bypass mode or continues to operate in a normal mode until all of the indicated command packet(s) following the multicast indication packet are successfully processed. For example, the storage devices that are intended to process the at least one command packet continue to operate in the normal mode, and the storage devices that are not intended to process the at least one command packet operate in the packet bypass mode. While in the packet bypass mode, a storage device receives a command packet and transmits the command packet to a next storage device (e.g., the directly connected storage device) in the ring topology 106 without processing the command packet.

Figure 2:
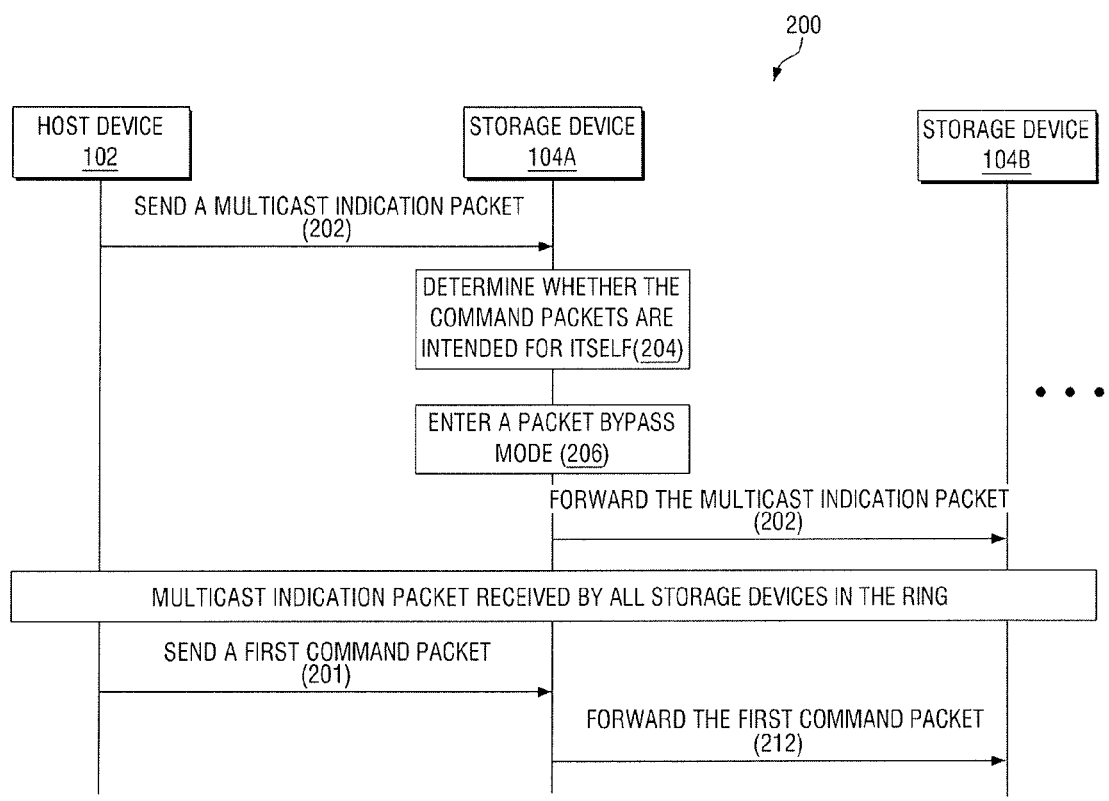
FIG. 2 is a flow diagram illustrating an exemplary method of handling multicast command packets intended for multiple storage devices connected in a ring topology storage network, according to an exemplary embodiment of the present invention.

FIG. 2 is a flow diagram 200 illustrating an exemplary method of handling multicast command packets intended for multiple storage devices connected in a ring topology storage network, according to an exemplary embodiment of the present invention. In an example referring to FIG. 2, it is assumed that the host device 102 intends to issue read/write commands to multiple storage devices (e.g., storage devices 104B, 104C and 104E) in the ring topology 106 of FIG. 1. Further, although the example is described with reference to a plurality of command packets intended for one or more, but not all of the storage devices 104A-104F, a single command packet may be intended for one or more, but not all of the storage devices 104A-104F. At operation 202, the host device 102 sends a multicast indication packet—which indicates that at least one command packet following the multicast indication packet is intended for two or more, but not all storage devices 104B, 104C and 104E in the ring topology 106—to the first storage device (e.g., storage device 104A) in the ring topology 106. For example, the host device 102 may set a value in the header of the multicast indication packet that indicates that that command packets following the multicast indication packet are intended for multiple storage devices 104B, 104C and 104E, but not all storage devices 104A-104F.

Upon receiving the multicast indication packet, at operation 204, the storage device 104A (e.g., the first storage device in the ring) determines whether the command packets following the multicast indication packet are intended for itself. For example, the storage device 104A may determine whether the command packets are intended for itself based on a device identifier(s) indicated in the header field of the multicast indication packet. If the storage device 104A determines that the command packets are not intended for itself, the storage device 104A transitions from a normal mode of operation to a packet bypass mode at operation 206. A determination of whether the command packets are intended for a storage device may be made by that particular storage device itself, or by another component within the ring topology 106. In exemplary embodiments, the storage device 104A may remain in the packet bypass mode until all of the command packets are processed by the intended storage devices 104B, 104C and 104E and response packets are successfully received by the host device 102 from the intended storage devices 104B, 104C and 104E. At operation 208, the storage device 104A forwards the multicast indication packet to the next storage device (e.g., the directly connected storage device) in the ring topology 106 (e.g., storage device 104B). Once the multicast indication packet has been received by all of the storage devices 104A-104F in the ring topology 106, the host device 102 sends a first command packet corresponding to the multicast indication packet (e.g., the first command packet of the command packet(s) intended for the storage devices indicated in the multicast indication packet) to the storage device 104A at operation 210.

At operation 212, the storage device 104A forwards the first command packet to the storage device 104B without processing the first command packet, since the storage device 104A is operating in the packet bypass mode. The processing of the multicast indication packet and the subsequent command packets by the storage device 104B, which is an intended recipient, is described in further detail with reference to FIG. 3.

Figure 3:
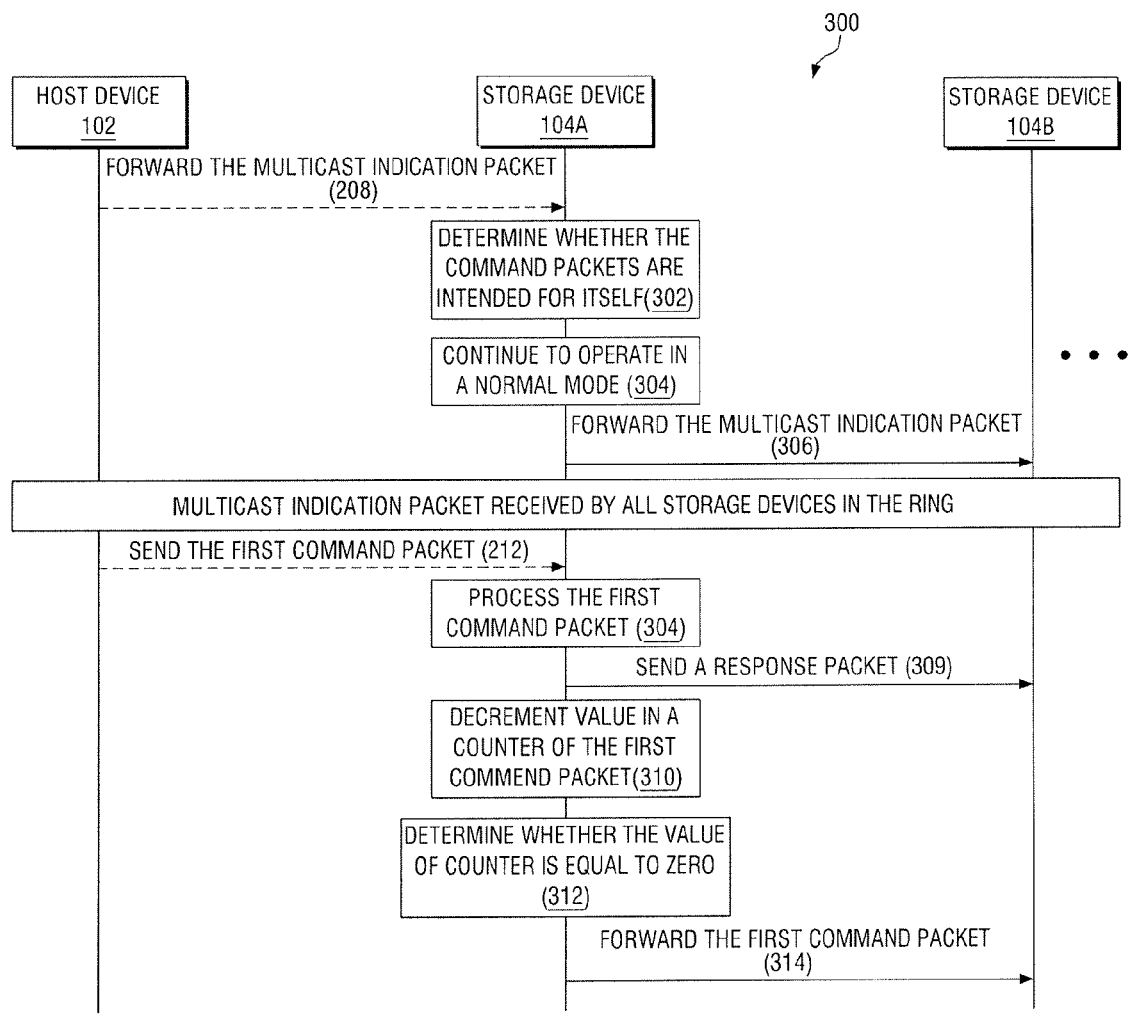
FIG. 3 is a flow diagram illustrating an exemplary method of handling multicast command packets intended for multiple storage devices connected in a ring topology, according to an exemplary embodiment of the present invention.

FIG. 3 is a flow diagram 300 illustrating an exemplary method of handling multicast command packets intended for multiple storage devices connected in a ring topology, according to an exemplary embodiment of the present invention. Although the example described herein is described with reference to a plurality of command packets intended for one or more, but not all of the storage devices 104A-104F, a single command packet may be intended for one or more, but not all of the storage devices 104A-104F. At operation 302, upon receiving the multicast indication packet from the storage device 104A, the storage device 104B determines whether the command packets following the multicast indication packet are intended for itself. For example, the storage device 104B may check the device identifier(s) in the header field of the multicast indication packet and determine whether the command packets are intended for itself. If it is determined that the command packets are intended for itself, the storage device 104B continues to operate in a normal mode at operation 304. At operation 306, the storage device 104B forwards the multicast indication packet to the next storage device in the ring topology 106 (e.g., storage device 104C).

Once the multicast indication packet has been received by all of the storage devices 104A-104F in the ring topology 106, the host device 102 sends a first command packet corresponding to the multicast indication packet (e.g., the first command packet of the command packet(s) intended for the storage devices indicated in the multicast indication packet) to the storage device 104A. As described with reference to operation 212, the storage device 104A forwards the first command packet to the storage device 104B without processing the packet, since none of the command packets following the multicast indication packet are intended for the storage device 104A. At operation 308, the storage device 104B, operating in the normal mode, processes the first command packet received from the storage device 104A. At operation 309, the storage device 104B sends a response packet to the storage device 104C. The storage device 104C forwards the response packet to the storage device 104D, which then forwards the response packet to the storage device 104E. The storage device 104E then forwards the response packet to the storage device 104F, which forwards the response packet to the host device 102.

At operation 310, the storage device 104B decrements a value in a counter of the first command packet by one. The value of the counter indicates, for example, the number of storage devices remaining that will process the first command packet. In an exemplary embodiment, a device identifier field in the header of the command packet is used to indicate the counter value. In exemplary embodiments, the host device 102 sets the total number of storage devices that are intended to process the first command packet in the device identifier field. Referring to the current example, since the first command packet is intended for three storage devices (e.g., storage devices 104B, 104C and 104E), and the first command packet has already been processed by the storage device 104B, the storage device 104B decrements the value of the counter in the device identifier field by one. That is, once decremented, the counter will indicate the value as '2' since the first command packet has yet to be processed by the storage devices 104C and 104E. At operation 312, the storage device 104B determines whether the value of the counter in the first command packet is equal to zero. Referring to the current example, since the value of the counter is not equal to zero, at operation 314, the storage device 104B forwards the first command packet to the next storage device in the ring topology 106 (e.g., storage device 104C), and the storage device 104C forwards the response packet from the storage device 104B to the storage device 104D. The storage device 104C repeats operations 302 to 314 since the command packets following the multicast indication packet are intended for storage device 104C. Similarly, the storage device 104E repeats operations 302 to 314 since the command packets following the multicast indication packet are intended for storage device 104E. Since the value of counter is changed to zero at the storage device 104E, the storage device 104E drops the first command packet, and does not perform operation 314. That is, in the current example, the storage device 104E does not send the first command packet to the next storage device (e.g., storage device 104F).

Once the response packets for the first command packet are received from the storage devices 104B, 104C and 104E, the host device 102 sends a second command packet to the storage device 104A that is intended for the storage devices 104B, 104C and 104E. In this case, operations 210 to 212 and 302 to 314 are repeated. Further, operations 210 to 212 and 302 to 314 are repeated until all of the command packets corresponding to the multicast indication packet are processed by the intended storage devices 104B, 104C and 104E.

Figure 4:
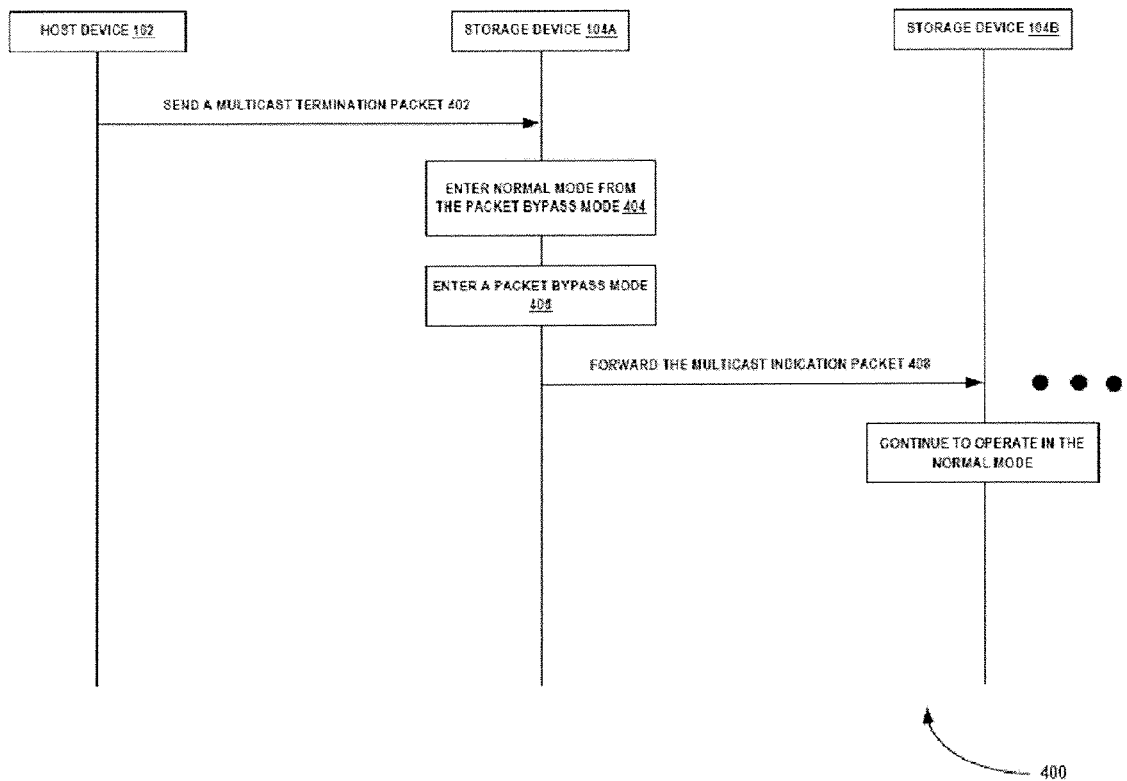
FIG. 4 is a flow diagram illustrating an exemplary method of changing a mode of operation once the command packet(s) following a multicast indication packet have been processed by intended storage devices, according to an exemplary embodiment of the present invention.

FIG. 4 is a flow diagram 400 illustrating an exemplary method of changing the mode of operation once the command packet(s) following the multicast indication packet have been processed by the intended storage devices 104B, 104C and 104E, according to an exemplary embodiment of the present invention. Although the example described herein is described with reference to a plurality of command packets intended for one or more, but not all of the storage devices 104A-104F, a single command packet may be intended for one or more, but not all of the storage devices 104A-104F. A Once all of the command packets have been processed, at operation 402, the host device 102 sends a multicast termination packet to the storage device 104A. The multicast termination packet indicates that the processing of the command packets following the multicast indication packet that were intended for more than one, but not all of the storage devices 104A-104F, is complete. At operation 404, the storage device 104A transitions from the packet bypass mode to the normal mode of operation. At operation 406, the storage device 104A forwards the multicast termination packet to the storage device 104B. Since the storage device 104B is already operating in the normal mode, the storage device 104B forwards the multicast termination packet to the storage device 104C, which then forwards the multicast termination packet to the storage device 104D. Since the command packets were intended for the storage devices 104B, 104C and 104E, the storage device 104D, which is currently operating in the packet bypass mode, transitions to the normal mode of operation based on the information in the multicast termination packet. In this manner, referring to FIGS. 2 to 4, processing of the same command packet(s) by two or more devices, but not all storage devices, may be enabled at a single point of time without requiring the host device 102 to send the same command packet repetitively for processing by a different intended storage device each time.

Figure 5A:
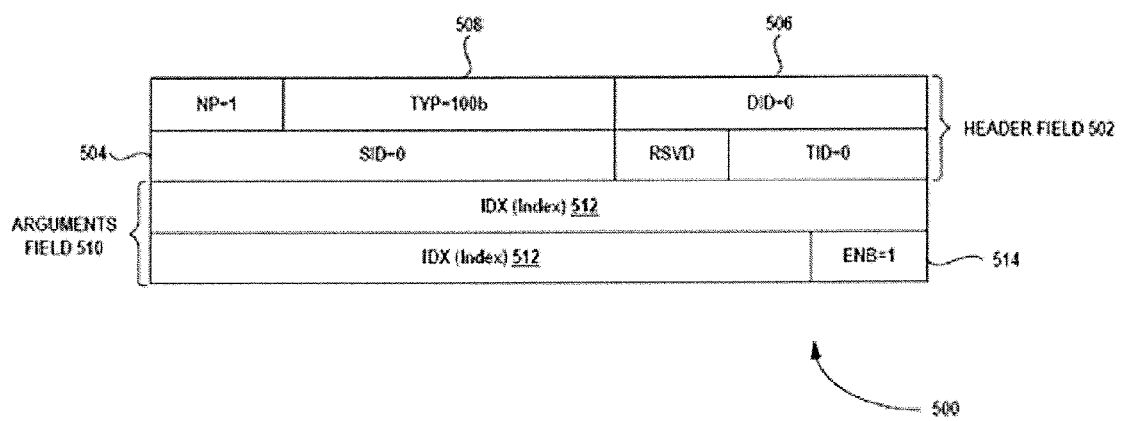
FIG. 5A illustrates a multicast indication packet, according to an exemplary embodiment of the present invention.

FIG. 5A illustrates a multicast indication packet 500, according to an exemplary embodiment of the present invention. For example, the multicast indication packet 500 may include a header field 502 and an argument field 510. The header field 502 contains a Source Identifier (SID) field 504, a Destination Identifier (DID) field 506, and a Packet type field 508. The SID field 504 indicates whether a command packet(s) following the multicast indication packet is intended for a single storage device. The DID field 506 indicates a device identifier associated with the single storage device for which the command packet(s) is intended. The packet type field 508 indicates the type of packet. For example, the value set in the packet field 508 indicates whether the packet is a multicast indication packet or a broadcast packet. In an example, for the multicast indication packet, the SID field 504 is set to '0', the DID field 506 is set to '0', and the packet type field 508 is set to '100b'.

The argument field 510 includes an enable field 514 and an index field 512. The enable field 514 indicates whether one or more command packets are following the multicast indication packet 500. If the one or more command packets are following the multicast indication packet 500, the enable field 514 is set to '1'.

Figure 5B:
FIG. 5B illustrates an exemplary index field of the multicast indication packet of FIG. 5A, according to an exemplary embodiment of the present invention.

FIG. 5B illustrates an exemplary index field 512 of the multicast indication packet 500 of FIG. 5A, according to an exemplary embodiment of the present invention. The index field 512 shown in FIG. 5B corresponds to a ring topology 106 in which 15 storage devices are connected, however exemplary embodiments are not limited thereto. In FIG. 5B, the index field 512 is 15 bits, and each bit indicates whether a particular storage device is an intended recipient. Each bit corresponding to the storage device in the ring topology 106 is set either to value '0' or value '1'. The value '1' in the corresponding bit field indicates that the command packets following the multicast indication packet 500 are intended for that storage device, and the value '0' in the corresponding bit field indicates that the command packets following the multicast indication packet 500 are not intended for that storage device (in an exemplary embodiment, the values '1' and '0' may be swapped). For example, a storage device in the ring topology 106 may enter the packet bypass mode when the value in the corresponding bit field is set to '0'. When the storage device is set to a value '1', the storage device continues to operate in the normal mode. As depicted in FIG. 5B, the index field 512 indicates that the storage devices D2 and D3 are intended recipients of command packet(s) following the multicast indication packet 500, and the storage devices D1 and D4-D15 are not intended recipients.

Figure 5C:
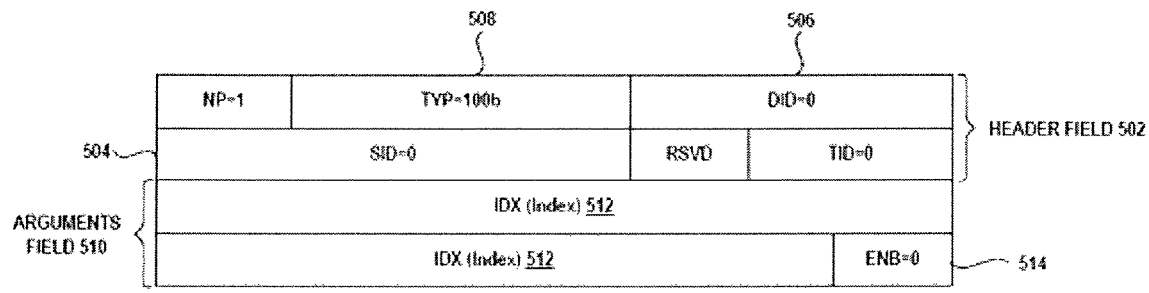
FIG. 5C illustrates a multicast termination packet, according to an exemplary embodiment of the present invention.

FIG. 5C illustrates a multicast termination packet 575, according to an exemplary embodiment of the present invention. The multicast termination packet 575 may be similar to the multicast indication packet 500 of FIG. 5A, except for the enable field 514. Once the command packet(s) following the multicast indication packet 500 have been processed, the host device 102 sends the multicast termination packet 575 with the enable field 514 set to '0'. When set to '0', the enable field 514 indicates that the command packets intended for the multiple storage devices in the ring topology 106 have been successfully processed, and the storage devices in the packet bypass mode can return to the normal mode of operation. Accordingly, the storage devices in the packet bypass mode enter the normal mode of operation in response to the multicast termination packet 575.

Figure 6:
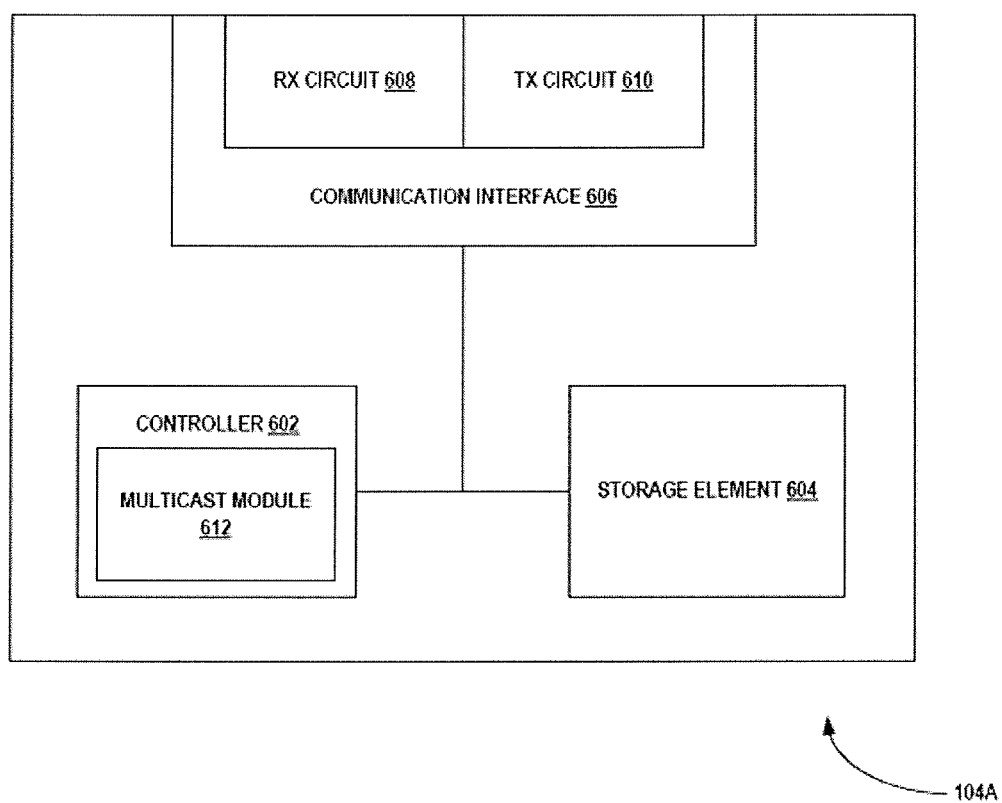
FIG. 6 illustrates a storage device, according to an exemplary embodiment of the present invention.

FIG. 6 illustrates a storage device 104A, according to an exemplary embodiment of the present invention. The storage device 104A may include a controller 602 such as, for example, a processor, microcontroller, or other type of arithmetic logic unit. The controller 602 may include a multicast module 612 that performs the operations described with reference to FIGS. 2 to 4. The storage device 104A may further include a storage element 604 or other type of memory such as, for example, a non-volatile memory, a random access memory (RAM), flash storage, one or more registers, or other tangible storage or input/output communication interfaces (e.g., Bluetooth, Wi-Fi, WiGIG, etc). The storage device 104A may include a communication interface 606 that has a receiver (Rx) circuit 608 and a transmitter (Tx) circuit 610. The receiver (Rx) circuit 608 is configured to receive messages such as, for example, a control command packet, data command packet, multicast indication packet, or multicast termination packet, from a previous device on the communication path (e.g., the host device 102), via the network. The transmitter (Tx) circuit 610 is configured to transmit messages such as, for example, response packets, to a next device on the communication path (e.g., the second device 104B via the network).

In accordance with the exemplary embodiments described herein, the time taken for completion by all of the target devices may be expressed as a function of the number of storage devices in the ring (N), and the number of target devices required to process the same command packet (d).

For example, the processing time in a conventional method (Tpp) may be expressed as $d(N+1)*Tt+d*Tp$, and the processing time according to exemplary embodiments of the present invention (Tmc) may be expressed as $(N+d)*Tt+d*Tp$. Therefore, the time improvement in terms of time taken for packet transition according to exemplary embodiments may be expressed as $(Tt)=Tpp-Tmc=Fn(N,d)=(d-1)*N*Tt$.

Consider an example in which a ring topology storage network contains eight storage devices (e.g., D1 to D8), and two of the storage devices D5 and D6 are target devices. Consider that the time taken to transfer a command packet from one storage device to another storage device is Tt, and the time taken to process a command packet by a single storage device is Tp, where two command packets are to be issued by the host device. According to conventional techniques, the total time taken to complete processing of one control command packet (e.g., using a Peer-to-Peer (P2P) command) may be expressed as 9Tt+1Tp, and the total time taken for processing the control command packet by the storage devices D5 and D6 may be expressed as 18Tt+2Tp. According to exemplary embodiments of the present invention, the total time taken to complete processing of command packets by the storage devices D5 and D6 may be expressed as 10Tt+2Tp, illustrating time savings of about 8Tt.

It is to be understood that exemplary embodiments of the present invention may be implemented in various forms of hardware, software, firmware, special purpose processors, or a combination thereof. For example, exemplary embodiments of the present invention may be embodied directly in hardware, in a software module executed by a processor, or in a combination of the two. A software module may be tangibly embodied on a non-transitory program storage device such as, for example, in RAM memory, flash memory, ROM memory, EPROM memory, EEPROM memory, registers, a hard disk, a removable disk, a CD-ROM, or any other form of storage medium known in the art.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of handling multicast command packets in a ring topology, comprising:
   transmitting a multicast indication packet, wherein the multicast indication packet indicates that at least one command packet following the multicast indication packet is intended for at least two of a plurality of storage devices connected in the ring topology;
   determining whether the at least one command packet following the multicast indication packet is intended for each storage device from among the plurality of storage devices based on the multicast indication packet,
   wherein the multicast indication packet and the at least one command packet are separate packets, and the at least one command packet is transmitted after the multicast indication packet is transmitted; and
   operating at least one storage device from among the plurality of storage devices that the at least one command packet is not intended for in a packet bypass mode until the at least one command packet has been processed by the at least two storage devices that the at least one command packet is intended for.

2. The method of claim 1, further comprising:
   forwarding the multicast indication packet to a next storage device in the ring topology.

3. The method of claim 1, further comprising:
   transitioning the at least one storage device that the at least one command packet is not intended for from the packet bypass mode to a normal mode of operation upon receiving a multicast termination packet, wherein the multicast termination packet indicates that processing of the at least one command packet by the at least two storage devices that the at least one command packet is intended for is complete.

4. The method of claim 1, further comprising:
   continuously operating the at least two storage devices that the at least one command packet is intended for in a normal mode.

5. The method of claim 4, further comprising:
   processing the at least one command packet following the multicast indication packet by the at least two storage devices that the at least one command packet is intended for.

6. The method of claim 5, further comprising:
   sending a response packet to a host device connected to the ring topology; and
   sending the at least one command packet following the response packet to a next storage device in the ring topology.

7. A storage device in a ring topology storage network, comprising:
- a communication interface configured to receive a multicast indication packet from another storage device,
- wherein the multicast indication packet indicates that at least one command packet following the multicast indication packet is intended for at least two of a plurality of storage devices connected in the ring topology storage network,
- wherein the multicast indication packet and the at least one command packet are separate packets, and the at least one command packet is received after the multicast indication packet is received; and
- a controller coupled to the communication interface, wherein the controller comprises a multicast packet processing module configured to determine whether the at least one command packet following the multicast indication packet is intended for the storage device, and operate in a packet bypass mode until the at least one command packet is processed by the at least two storage devices that the at least one command packet is intended for when the at least one command packet is not intended for the storage device.

8. The storage device of claim 7, wherein the communication interface is configured to forward the multicast indication packet to a next storage device in the ring topology storage network.

9. The storage device of claim 7, wherein the communication interface is configured to receive a multicast termination packet that indicates that processing of the at least one command packet by the at least two storage devices that the at least one command packet is intended for is complete.

10. The storage device of claim 9, wherein the multicast packet processing module is configured to transition from the packet bypass mode to a normal mode of operation based on the multicast termination packet.

11. The storage device of claim 7, wherein the multicast packet processing module is configured to continuously operate in a normal mode when the at least one command packet following the multicast indication packet is intended for the storage device.

12. The storage device of claim 11, wherein the multicast packet processing module is configured to process the at least one command packet following the multicast indication packet when the at least one command packet is intended for the storage device.

13. The storage device of claim 12, wherein the communication interface is configured to:
- send a response packet to a host device connected to the ring topology storage network; and
- send the at least one command packet following the response packet to a next storage device in the ring topology storage network.

14. A ring topology storage system, comprising:
- a host device; and
- a plurality of storage devices in communication with the host device,
- wherein the host device is configured to send a multicast indication packet to a first storage device from among the plurality of storage devices, the multicast indication packet indicating that at least one command packet following the multicast indication packet is intended for at least two of the plurality of storage devices,
- wherein the multicast indication packet and the at least one command packet are separate packets, and the at least one command packet is sent after the multicast indication packet is sent,
- wherein each of the plurality of storage devices is configured to determine whether the at least one command packet following the multicast indication packet is intended for itself,
- wherein each of the plurality of storage devices is configured to operate in a packet bypass mode until the at least one command packet is processed by the at least two storage devices that the at least one command packet is intended for when the at least one command packet following the multicast indication packet is not intended for itself,
- wherein each of the plurality of storage devices is configured to continuously operate in a normal mode when the at least one command packet following the multicast indication packet is intended for itself.

15. The system of claim 14, wherein each of the storage devices is configured to forward the multicast indication packet to a next storage device in the ring topology storage system.

16. The system of claim 15, wherein the host device is configured to transmit a multicast termination packet to the first storage device, wherein the multicast termination packet indicates that processing of the at least one command packet by the at least two storage devices that the at least one command packet is intended for is complete.

17. The system of claim 16, wherein each of the plurality of storage devices is configured to forward the multicast termination packet to the next storage device.

18. The system of claim 14, wherein each of the plurality of storage devices is configured to process the at least one command packet following the multicast indication packet when the at least one command packet is intended for itself.

19. The system of claim 18, wherein each of the plurality of storage devices is configured to:
- send a response packet to a next storage device from among the plurality of storage devices; and
- send the at least one command packet following the response packet to the next storage device from among the plurality of storage devices.

20. The system of claim 19, wherein the each of the plurality of storage devices is configured to:
- decrement a counter in the at least one command packet upon successfully processing the at least one command packet, wherein the counter indicates a number of storage devices remaining that will process the at least one command packet;
- determine whether the counter is equal to zero;
- drop the at least one command packet upon determining that the counter is equal to zero; and
- send the at least one command packet following the response packet to the next storage device from among the plurality of storage devices upon determining that the counter is greater than zero.

* * * * *